US006261376B1

(12) United States Patent
Jeffcoat et al.

(10) Patent No.: US 6,261,376 B1
(45) **Date of Patent: *Jul. 17, 2001**

(54) THERMALLY-INHIBITED PREGELATINIZED NON-GRANULAR STARCHES AND FLOURS

(75) Inventors: Roger Jeffcoat, Bridgewater; Chung-Wai Chiu, Westfield; Manish B. Shah, Franklin Park, all of NJ (US); David J. Thomas, Eagan, MN (US); Douglas J. Hanchett, Wharton, NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,671

(22) Filed: Nov. 10, 1999

Related U.S. Application Data

(60) Continuation of application No. 08/959,087, filed on Oct. 28, 1997, now Pat. No. 6,010,574, which is a division of application No. 08/476,963, filed on Jun. 7, 1995, now Pat. No. 5,720,822.

(51) Int. Cl.[7] .......... C08B 30/00; C08B 30/12; C13F 3/00; A23G 3/00; A23L 1/05

(52) U.S. Cl. .......... 127/65; 127/29; 127/32; 127/67; 127/71; 426/658; 426/661

(58) Field of Search .......... 127/65, 32, 29, 127/67, 71; 426/658, 661

(56) References Cited

U.S. PATENT DOCUMENTS

| | | | |
|---|---|---|---|
| 1,516,512 | 11/1924 | Stutzke . | |
| 1,901,109 | 3/1933 | Maier . | |
| 2,314,459 | 3/1943 | Salzburg | 99/139 |
| 2,317,752 | 4/1943 | Fuller | 127/33 |
| 2,373,016 | 4/1945 | Daly et al. | 127/70 |
| 3,086,890 | 4/1963 | Sarko et al. | 127/69 |
| 3,137,592 | 6/1964 | Protzman et al. | 127/32 |
| 3,332,785 | 7/1967 | Kuchinke et al. | 99/139 |
| 3,490,917 | 1/1970 | Doe et al. | 99/93 |
| 3,578,497 | 5/1971 | Hjermstad | 127/32 |
| 3,630,775 | 12/1971 | Winkler | 127/71 |
| 3,725,387 | 4/1973 | McClendon et al. | 260/233.3 |
| 3,904,429 | 9/1975 | Eastman et al. | 127/71 |
| 3,977,897 | 8/1976 | Wurzburg et al. | 127/71 |
| 4,013,799 | 3/1977 | Smaligan et al. | 426/578 |
| 4,131,574 | 12/1978 | Isherwood et al. | 260/17.3 |
| 4,207,355 | 6/1980 | Chiu et al. | 426/578 |
| 4,303,451 | 12/1981 | Seidel et al. | 127/32 |
| 4,303,452 | 12/1981 | Ohira et al. | 127/32 |
| 4,391,836 | 7/1983 | Chiu | 426/578 |
| 4,491,483 | 1/1985 | Dudacek et al. | 127/33 |
| 5,368,690 | 11/1994 | Solarek et al. | 162/175 |

FOREIGN PATENT DOCUMENTS

| | | |
|---|---|---|
| 1 150 934 | 8/1983 | (CA) . |
| 0 129 227 A1 | 12/1984 | (EP) . |
| 0 257 338 A2 | 3/1988 | (EP) . |
| 0 415 385 A2 | 3/1991 | (EP) . |
| 0 490 424 A1 | 6/1992 | (EP) . |
| 263897 | 12/1926 | (GB) . |
| 530226 | 12/1940 | (GB) . |
| 595552 | 12/1947 | (GB) . |
| 1479515 | 7/1977 | (GB) . |
| 61-254602 | 11/1986 | (JP) . |
| WO 95/04082 | 2/1995 | (WO) . |

OTHER PUBLICATIONS

Irving Martin, *Journal of Applied Polymer Science*, "Crosslinking of Starch by Alkaline Roasting", vol. 11, No. 7, pp. 1283–1288 (Jul. 1967).

J.W. Donovan, et al., *Cereal Chemistry*, "Differential Scannign Calorimetry of Heat–Moisture Treated Wheat and Potato Starches", vol. 60, No. 5, pp. 381–387 (Oct. 1983).

Rolfe Stute, *Starch/Stärke*, "Hydrothermal Modification of Starches" The Difference Between Annealing and Heat/Moisture Treatment, vol. 44, No. 6, pp. 205–214, Apr. 1991.

Copy of PCT Search Reports for PCT/US95/00682, PCT/US95/00688, PCT/US95/00684, PCT/US94/08559, PCT/US95/09138, PCT/US96/00612, PCT/US96/00613, PCT/US96/00629, PCT//US96/07071, PCT/US96/00988; and PCT/US96/00999.

*Primary Examiner*—Mark L. Bell
*Assistant Examiner*—Patricia L. Hailey
(74) *Attorney, Agent, or Firm*—Margaret B. Kelley; Ellen T. Dec

(57) ABSTRACT

Thermally-inhibited, pregelatinized non-granular starches and flours are prepared by pregelatinizing the starch or flour and thermally inhibiting the starch or flour by dehydrating the starch or flour to anhydrous or substantially anhydrous and then heat treating the dehydrated starch. The pregelatinization may be carried out prior to or after the thermal inhibition using known methods which disrupt the granular structure such by drum drying or jet cooking and spray-drying. Preferably the starch or flour is adjusted to a pH above 7.0 prior to the thermal inhibition. The starch may be dehydrated by heating the starch in a suitable heating apparatus, by extracting the water from the starch using a solvent such as ethanol, or by freeze drying the starch. Preferably the starch or flour is treated with a solvent to remove proteins and/or lipids and thus prevent off flavors.

43 Claims, No Drawings

THERMALLY-INHIBITED PREGELATINIZED NON-GRANULAR STARCHES AND FLOURS

This application is continuation of Ser. No. 08/959,087 filed Oct. 28, 2997, now U.S. Pat. No. 6,010,574, which is division of Ser. No. 08/476,963 filed Jun. 7, 1995, now U.S. Pat. No. 5,720,822, issued Feb. 24, 1998.

BACKGROUND OF THE INVENTION

This invention relates to pregelatinized non-granular starches and flours that are inhibited and to a process for their preparation.

Native starch granules are insoluble in cold water. When native granules are dispersed in water and heated, however, they become hydrated and swell. With continued heating, shear, or conditions of extreme pH, the gelatinized granules fragment and the starch molecules are dispersed in the water, i.e., solubilized.

Pregelatinized starches (i.e., cold-water-soluble or dispersible starches) are typically prepared by thermal, chemical, or mechanical gelatinization. The term "gelatinized" or "cooked" starch refers to swollen starch granules which have lost their polarization crosses and which may or may not have lost their granular structure.

The thermal processes generally used to prepare such starches include batch cooking, autoclaving, and continuous cooking processes in a heat exchanger or jet-cooker. The thermal dispersion of a granular starch in water involves a complex mechanism. See the discussion at pp. 427–444 in Chapter 12, by Kruger & Murray of *Rheology & Texture in Food Quality*, Edited by T. M. DeMan, P. W. Voisey, V. F. Rasper, and D. W. Stanley (AVI Publishing, Westport, Conn. 1976), at pp. 449–520 in Chapter 21 of *Starch: Chemistry & Technology*, Vol. 2, edited by R. Whistler (Academic Press, New York, N.Y. 1967) and at pp. 165–171 in Chapter 4 by E. M. Osman of *Food Theory and Applications*, edited by P. C. Paul and H. H. Palmer (John Wiley & Sons, Inc., New York, N.Y. 1972). The process begins at the gelatinization temperature, as water is absorbed into the starch granules, and continues as the hydrated granules swell and disrupt into smaller granular fragments until the starch finally approaches a molecular dispersion. The viscosity of the cook changes significantly during this process, increasing as the granules hydrate and swell and decreasing as the granular fragments are reduced in size. An appropriate amount of shear aids in breaking down the swollen granular fragments to give a molecular dispersion without substantial molecular degradation.

Depending on the starch base, the pregelatinized starch will exhibit specific texture and viscosity characteristics after the starch is dispersed in water. Starches containing amylose will exhibit a gel-like non-cohesive texture. Starches containing high levels of amylose, for example, over 40%, will set to a very firm gel. Unmodified amylose-containing starches pregelatinized by drum drying or extrusion frequently have a pulpy texture when dispersed in water. Starches which contain mainly amylopectin, i.e., waxy starches, do not provide the same gel characteristics as amylose-containing starches. The dispersions of unmodified pregelatinized amylopectin-containing starches exhibit a cohesive and runny texture when dispersed in water.

The texture can be improved if the waxy starches are chemically crosslinked prior to pregelatinization. The crosslinks reinforce the associative hydrogen bonds holding the granules together, inhibit the swelling and hydration of the starch granules during pregelatinization, and consequently, the crosslinked starch granules remain intact. When pregelatinized powders of the chemically crosslinked starches are dispersed in water, the dispersions have a non-cohesive and salve-like texture, which is described as heavy or short.

It is desirable for a pregelatinized starch to be bland in flavor. Many starches such as corn, sorghum, and wheat contain small quantities of unsaturated fatty acids. The fatty acids may develop rancid flavors due to air oxidation. In addition, the proteins present give the starches an undesirable cereal taste. Certain starches, such as corn and waxy maize, are not used in thickened food compositions due to "woody" or "popsicle stick" off-flavors resulting from pregelatinization. See U.S. Pat. No. 4,303,451 (issued Dec. 1, 1981 to W. C. Seidel) which discloses a method for preventing the development of "woody" off-flavors in pregelatinized waxy maize starches. The starch granules are heated, prior to gelatinization, at about 120–200° C. for 0.1–24 hours. The heating time must be insufficient to effect dextrinization but sufficient to prevent formation of woody off-flavors during pregelatinization. The texture and flavor of corn, wheat, rice and sago were modified by this heat treatment, but these starches gave inconsistent and non-reproducible results in food compositions (see Col. 2, lines 14–18).

In some applications, chemically modified starches and flours are unacceptable or undesirable. Thus, there is a need for unmodified pregelatinized non-granular starches which have the textural properties of chemically crosslinked pregelatinized non-granular starches and which are substantially free of off tastes.

SUMMARY OF THE INVENTION

The present invention provides thermally-inhibited, pregelatinized non-granular starches and flours. These starches and flours are pregelatinized using a process that ruptures the starch granules. The starches and flours are also thermally inhibited which causes the starch or flour to have the viscosity and textural characteristics of a chemically crosslinked starch, but without the use of chemical reagents. The thermally-inhibited, pregelatinized non-granular starches or flours are dispersible in cold water and, if sufficiently inhibited, possess a non-cohesive, salve-like texture if the starch is an amylopectin-containing starch or a gel-like texture if the starch is an amylose-containing starch.

The starches and flours may be pregelatinized first and subsequently thermally inhibited or they may be thermally inhibited first and subsequently pregelatinized.

The thermal inhibition process comprises the steps of (a) optionally pH adjusting the granular or non-granular starch or flour to a pH of about 7.0 or above; (b) dehydrating the starch or flour until it is anhydrous or substantially anhydrous; and (c) heat treating the dehydrated starch or flour at a temperature and for a period of time sufficient to inhibit, the starch or flour and preferably render it non-cohesive. As used herein, "substantially anhydrous" means containing less than 1% moisture by weight.

If the pregelatinization is performed first, a granular starch or flour is slurried in water in a ratio of 2.0 to 2.5 parts water to 1.0 part starch and preferably the pH is adjusted to neutral or greater by the addition of a base. As used herein, "neutral" covers the range of pH values around pH 7 and is meant to include from about pH 6.5 to about pH 7.5. The slurry is pregelatinized using known pregelatinization procedures which disrupt the granular structure and then dried to about 2–15% moisture. The dried pregelatinized non-granular starch or flour is then thermally inhibited by dehydrating the pregelatinized non-granular starch or flour to anhydrous or substantially anhydrous and then heat treating the dehydrated pregelatinized non-granular starch.

Alternatively, if the starch or flour is thermally inhibited prior to pregelatinization, the granular starch or flour is slurried in water, optionally the pH is adjusted to neutral or greater by the addition of a base, and the starch or flour is dried to about 2–15% moisture. The dried granular starch or flour is then thermally inhibited by dehydrating the starch or flour to anhydrous or substantially anhydrous and then heat treating the dehydrated starch. The resulting granular thermally-inhibited starch is then pregelatinized using known pregelatinization procedures which disrupt the granular structure.

The dehydration may be a thermal dehydration or a non-thermal dehydration. The thermal dehydration is carried out by heating the starch in a convention oven or a microwave oven, or any other heating device for a time and at a temperature sufficient to reduce the moisture content to less than 1%, preferably 0%. Examples of non-thermal dehydrating methods include extracting the water from the granular starch or pregelatinized starch using a hydrophilic solvent such as an alcohol (e.g., ethanol) or freeze drying the starch. As will be shown hereafter, dehydration with ethanol improves the taste of the thermally-inhibited starches compared to the thermally-inhibited starches prepared by directly heating the starch to dehydrate it. It is expected freeze drying will also provide a taste advantage.

The preferred pH is at least 7, most preferably greater than pH 8, typically pH 7.5–10.5, preferably 8–9.5. At a pH above 12, gelatinization more easily occurs; therefore, pH adjustments below 12 are more effectual.

Buffers, such as sodium phosphate, may be use to maintain pH if needed. An alternative method of raising the pH consists of spraying a solution of a base onto a granular or pregelatinized starch until the starch attains the desired pH, either during or prior to the thermal inhibition steps. If the starch is not going to be used in a food, any suitable inorganic or organic base can be used to raise the pH of starch. Another method consists of infusing etc. It should be noted that the textural and viscosity benefits of the thermal inhibition process tend to be enhanced as the pH is increased, although higher pHs tend to increase browning of the starch during the heat treating step.

For food applications, suitable food grade bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, potassium hydroxide, and any other base approved for food use under Food and Drug Administration laws or other food regulatory laws. The preferred food grade base is sodium carbonate. Bases not approved for food use under these regulations may also be used, provided they can be washed from the starch so that the final product conforms to good manufacturing practices for the intended use.

By varying the process conditions, including the initial pH of the starch or flour, the dehydrating method and conditions, and the heat treating temperatures and times, the level of inhibition can be varied to provide different viscosity characteristics in the final pregelatinized non-granular starches or flours. Inasmuch as the dehydrating and heat treating parameters can be a function of the particular apparatus used for the heat treatment, the choice of apparatus will also be a factor in controlling the level of inhibition.

These starches are useful in food and industrial applications where pregelatinized chemically crosslinked non-granular starches are known to be useful.

Removal of various proteins, lipids, and other off-flavor components, prior to or after the thermal inhibition improves the flavor (i.e., taste or aroma) of the thermally-inhibited starches. A sodium chlorite extraction of the protein from a non-pregelatinized starch is exemplified hereafter. Other procedures which can be used for protein and/or lipid removal include washing the starch at an alkaline pH (e.g., pH 11–12) and/or treating the starch with proteases. Polar and non-polar solvents which have an affinity for proteins and/or lipids can also be used. Examples are alcohols (e.g., ethanol), ketones (e.g., acetone), ethers (e.g., dioxane), aromatic solvents (e.g., benzene or toluene), and the like.

DESCRIPTION OF THE PREFERRED EMBODIMENTS

The starches and flours can be derived from any source such as corn, pea, potato, sweet potato, barley, wheat, rice, sago, amaranth, tapioca, sorghum, waxy maize, waxy rice, waxy barley, waxy potato, waxy sago, waxy sorghum, and starches or flours having an amylose content of 40% or greater.

As used herein, a "native" starch is one as it is found in nature. The starches or starches may be unmodified or modified by conversion (i.e., enzyme-, heat-, or acid-conversion), oxidation, phosphorylation, etherification, esterification, and/or chemical crosslinking. The flours may be modified by bleaching or enzyme conversion.

Unless specifically distinguished, references to starch in this description are meant to include their corresponding flours.

The starches can be pregelatinized according to any of the known pregelatinization processes that result in the disruption of the granular structure. Pregelatinized starches are typically prepared by drum-drying, extrusion, or jet-cooking.

Suitable processes are disclosed in the following patents.

U.S. Pat. No. 1,516,512 issued Nov. 25, 1924 to R. W. G. Stutzke) describes a process in which starch slurries are forced through a heated pipe coil and then through a spraying orifice into a drying chamber. The slurries are forced through the coil at excessively high pressures (e.g., 1000 lbs.) in order to insure against the possibility of vaporizing the liquid under treatment. Steam is maintained at 35–110 pounds of pressure. The temperature of the air introduced into the drying chamber is about 121° C., which is reduced to about 96° C. at the point of evaporation. The resulting starches are hydrolyzed and are about 15–75% soluble in cold water.

U.S. Pat. No. 3,630,775 (issued Dec. 28, 1971 to A. A. Winkler) describes a spray-drying process in which a starch slurry is maintained under pressure during heating and continued under pressure through the atomization step. The pressure is interdependent with the viscosity, temperature, and apparatus. The pressure required is that necessary for atomization and is in excess of that necessary to prevent vaporization of water in slurries of high solids at elevated temperatures. The heating time is that which is sufficient to allow substantially complete gelatinization and solubilization of the starch if previously ungelatinized. Typically, the slurries (10–40% solids) are preheated to 54°–171° C., pumped under 2,000–6,800 psi of pressure through a continuous tubular heat exchanger, and heated to 182°–304° C. (which result in starch temperatures of 163°–232° C.). Retention time of the starch in the cooker is 1.0–2.5 minutes. A conventional spray-dryer with a pressure type atomizing nozzle is used. The resulting starches are greater than 50% cold-water soluble.

U.S. Pat. No. 3,086,890 (issued Apr. 23, 1963 to A. Sarko et al.) describes a process for preparing a pregelatinized isolated amylose powder. It involves autoclaving a slurry of an isolated amylose having an intrinsic viscosity of 1.3–2.9 at 191° C. under 5–140 psig of pressure for 1–60 minutes at 0.1–25% solids, cooling the dispersion to 90° C., and drum-drying on a 110–200° C. surface. The retention time on the drum is 40–75 seconds using a nip gap of 0.001 inch or less.

U.S. Pat. No. 3,137,592 (issued Jun. 16, 1964 to T. F. Protzman et al.) describes the extrusion of a starch-water mixture at elevated temperature and pressure, causing the gelatinization of the starch, followed by expansion during flashing off the water after exiting from the extruder. The temperature and pressure are generated by mechanical shear between the rotating screw (auger) and cylindrical housing (barrel) of the extruder. Cooking is accomplished with both thermal and mechanical energy as the starch is forced through the system. This typically results in high viscosity during the processing due to incomplete cooking and the final products are typically derated due to molecular breakdown caused by excessive shear. Upon redispersion, the powders can give undesirable grainy textures, especially when low moisture starches are processed, due to incomplete dispersion during cooking. When starch is processed in the presence of additional water, a further drying step is required after the extrudate exits the extruder. This extended drying time further exaggerates the undesirable textures upon redispersion.

Pregelatinized starches may be made by a conventional two step jet-cooking and spray-drying process. Modifications of this conventional process are described in U.S. Pat. No. 2,314,459 (issued Mar. 23, 1943 to A. A. Salzburg) and U.S. Pat. No. 3,332,785 (issued Jul. 25, 1967 to E. Kurchinke). In the typical process an aqueous starch slurry is cooked, usually by atmospheric vat cooking or by cooking in a heat exchanger or by steam-injection jet-cooking, held at atmospheric pressure in a tank (often a cooking tank in batch processes or a receiver tank for pressurized cooking processes), and subsequently spray-dried. The post-cooking holding period allows the batchwise addition of additives, temperature regulation, and/or cooking at rates which do not match the spray-dryer capacity. On exiting the holding tanks the temperature of the feed to the spray-dryer may range from 38°–93° C. Atomization is effected by a single fluid pressure nozzle, a centrifugal device, or a pneumatic nozzle. This process is usually limited to “thin-cooking starches”, i.e., converted starches where the polymeric structure has been degraded by acid hydrolysis, enzymatic degradation, oxidation and/or high levels of mechanical shear, because the pastes are lower in viscosity and can be atomized. The cooks of unmodified starches are difficult to atomize because of their high viscosity and therefore, if spray-dried, are processed at low solids. Jet-cooking provides appropriate shear levels and more readily gives a dispersion approaching complete solubility at a molecular level (see U.S. Pat. No. 2,805,966 (issued Sep. 10, 1957 to O. R. Ethridge); U.S. Pat. No. 2,582,198 (issued Jan. 8, 1957 to O. R. Ethridge); U.S. Pat. No. 2,919,214 (issued Dec. 29, 1959 to O. R. Ethridge); U.S. Pat. No. 2,940,876 (issued Jun. 14, 1960 to N. E. Elsas); U.S. Pat. No. 3,133,836 (issued May 19, 1964 to U. L. Winfrey); and U.S. Pat. No. 3,234,046 issued Feb. 8, 1966 to G. R. Etchison). Jet-cooking provides lower in-process viscosities, without degradation and allows the use of lower cooking and conveying temperatures and pressures which further assist in reducing degradation.

U.S. Pat. No. 3,607,394 (issued Sep. 21, 1971 to F. J. Germino et al.) is directed to a process for preparing a pregelatinized, cold water dispersible starch from a granular starches which contain at least 50% amylopectin, e.g., corn, wheat, barley, potato, tapioca, waxy maize, waxy rice, and waxy sorghum. The process involves pasting at 149° C. or above with and up to about 232° C. The starch paste is then dried very rapidly to prevent retrogradation or aggregation in any suitable apparatus, e.g., a drum-dryer, spray-dryer, belt dryer, foam mat dryer or the like.

A continuous coupled jet-cooking/spray-drying process is described in U.S. Pat. No. 5,131,953 (issued Jul. 21, 1992 to J. J. Kasica et al.) The process comprises steps of:

(a) forming a starch slurry or a starch paste of a granular starch and water;

(b) jet-cooking the starch slurry or the starch paste with steam at a temperature sufficient to form a starch solution or a starch dispersion;

(c) immediately conveying and introducing, under elevated temperature and pressure, the jet-cooked starch dispersion or the jet-cooked starch solution into a nozzle of a spray-dryer chamber;

(d) atomizing the jet-cooked starch dispersion or jet-cooked starch solution through the nozzle;

(e) drying the atomized mist within the spray-dryer chamber at a temperature sufficient to dry the dispersed or the solubilized starch; and (f) recovering the dried starch as a cold-water dispersible or a cold-water soluble powder.

For the thermal dehydration suitable conditions are low temperatures or raising the pH of the starch before the dehydration. The preferred conditions consist in a combination of a low temperature and neutral to basic pH. Preferably, the temperatures used to dehydrate the starch are 125° C. or lower, more preferably between 100–120° C. The dehydrating temperature can be lower than 100° C., but a temperature of at least 100° C. will be more effective in removing moisture.

When starches are subjected to heat in the presence of water, hydrolysis or degradation of the starch can occur. Hydrolysis or degradation will reduce the viscosity, thus limiting the effect of inhibition and is undesirable when a high viscosity product is desired. Therefore, the conditions for the dehydration of the starch need to be chosen so that inhibition is favored while reducing hydrolysis and degradation. Any conditions meeting that criteria can be used. Removing the water by solvent extraction or freeze drying are less likely to hydrolyze the starch than directly heating the starch to drive off the water.

For a laboratory scale dehydration with a solvent, the starch or flour (about 4–5% moisture) is placed in a Soxhlet thimble which is then placed in the Soxhlet apparatus. A suitable solvent is placed in the apparatus, heated to the reflux temperature, and refluxed for a time sufficient to dehydrate the starch or flour. Since during the refluxing the solvent is condensed onto the starch- or flour, the starch or flour is exposed to a lower temperature than the solvent's boiling point. For example, during ethanol (boiling point about 78° C.) extraction the temperature of the starch is only about 30–40° C. When ethanol is used as the solvent, the refluxing is continued for about 17 hours. The dehydrated starch or flour is removed from the thimble, spread out on a tray, and the excess solvent is allowed to flash off. With ethanol the time required for the ethanol to flash off is about 20–30 minutes. The starch or flour is immediately placed in a suitable heating apparatus for the heat treatment. For a commercial scale dehydration any continuous extraction apparatus can be used.

For dehydration by freeze drying, the starch or flour (4–5% moisture) is placed on a tray and put into a freeze dryer. A suitable bulk tray freeze dryer is available from FTS Systems of Stone Ridge, New York under the trademark Dura-Tap. The freeze dryer is run through a programmed cycle to remove the moisture from the starch or flour. The starch or flour temperature is held constant at about 20° C. and a vacuum is drawn to about 50 milliTorrs (mT). The time required to dehydrate the starch or flour is about 3 days. The starch or flour is removed from the freeze dryer and immediately placed into a suitable heating apparatus for the heat treatment.

After the starch is dehydrated, it is heat treated for a time and at a temperature, or range of temperatures, sufficient to inhibit the starch. The preferred heating temperatures are greater than 100° C. For practical purposes, the upper limit of the heat treating temperature is usually 200° C., at which temperature highly inhibited starches can be obtained. Typically the heat treating is carried out at 120°–180° C., preferably 140°–160° C., more preferably 160° C. The level of inhibition is dependent on the pH and heating temperature and time. For example, if the starch or flour is adjusted to pH 9 and the oven temperature is 160° C., a lightly inhibited starch or flour will require about 3–4 hours of heating, a moderately inhibited starch or flour will require about 4–5 hours of heating, and a highly inhibited starch or flour will require 5–6 hours of heating. For lower temperatures, longer heating times are required. When the starch or flour is at a lower pH, as with a native starch which has a pH of about 5.0–6.5, the heating will provide less inhibition.

For flours lower temperatures and/or shorter heating times are required to reach the same level of inhibition as compared to the corresponding starch.

When the starch is thermally dehydrated, the dehydrating and heat treating steps can be continuous and can be accomplished by the application of heat to the starch beginning from ambient temperature. When a fluidized bed is used, the moisture will be driven off and the starch will-be anhydrous before the temperature reaches about 125° C. After the starch or flour is anhydrous or substantially anhydrous and while the heating is continued, some level of inhibition will be attained before, simultaneously, or even the final heat treating temperature is reached.

The starches or flours may be inhibited individually or more than one may be inhibited at the same time. They may also may be inhibited in the presence of other materials or ingredients which would not interfere with the thermal inhibition process or alter the properties of the thermally-inhibited pregelatinized non-granular starches or flours.

The thermal dehydrating and heat treating steps may be performed at normal pressures, under vacuum or under pressure, and may be accomplished using any means known in the art. The preferred method is by the application of dry heat in air or in an inert gaseous environment The thermal dehydrating and heat treating apparatus can be any industrial oven, for example, conventional ovens, microwave ovens, dextrinizers, fluidized bed reactors and driers, mixers and blenders equipped with heating devices and other types of heaters, provided that the apparatus is fitted with a vent to the atmosphere so that moisture does not accumulate and precipitate onto the starch or flour. Preferably, the apparatus is equipped with a means for removing water vapor from the apparatus, such as, a vacuum or a blower to sweep air from the head-space of the apparatus, or a fluidizing gas. The heat treating step can be accomplished in the same apparatus in which the thermal dehydrating step occurs and, most conveniently, is continuous with the thermal dehydrating step. When the thermal dehydrating step is continuous with the heat treating step, and particularly when the apparatus used is a fluidized bed reactor or drier, the dehydrating step simultaneously occurs while the equipment is being brought up to the final heat treating temperature.

Thermally inhibited starches having high viscosities with low percentage breakdowns in viscosity are obtained in shorter times in fluidized bed reactor than in conventional heating ovens. Suitable fluidizing gases are air and nitrogen. For safety reasons, it is preferable to use a gas containing less than 12% oxygen.

A suitable fluidized bed reactor is manufactured by Procedyne Corporation of New Brunswick, New Jersey. The cross-sectional area of the fluidized bed reactor is 0.05 sq meter. The starting bed height is 0.77 meter. The fluidizing gas is air which is used at a velocity of 5–21 meter/min. The sidewalls of the reactor panels are heated with hot oil, and the fluidizing gas is heated with an electric heater. The samples are loaded to the reactor and then the fluidizing gas is introduced, or the samples are loaded while the fluidizing gas is being introduced. The samples are brought from ambient temperature to 125° C. until the samples become anhydrous and are further heated to the desired heat treating temperatures. When the heat treating temperature is 160° C., the time to reach that temperature will be less than three hours.

Sample Preparation

All the starches and flours used were provided by National starch and Chemical Company of Bridgewater, N.J. The controls for the test samples were from the same native sources as the test samples, were unmodified or modified in the same manner as the test samples, and were at the same pH, unless otherwise indicated. All starches and flours, both test and control samples, were prepared and tested individually.

For the samples pregelatinized by drum drying the pH was raised by slurrying the starch or flour in water at 30–40% solids and adding a sufficient amount of a 5% sodium carbonate solution until the desired pH was reached. A single steam-heated steel drum at about 142–145° C. was used for the drum drying.

For the samples pregelatinized by continuous coupled jet-cooking/spray-drying process of U.S. Pat. No. 5,131,953 or the dual atomization/spray-drying process of U.S. Pat. No. 4,280,851, the starch or flour was slurred at 6–10% solids in water and the pH was adjusted to the desired pH by adding a sufficient amount of 5% sodium carbonate solution until the desired pH was reached.

Unless specified, a conventional oven or dextrinizer was used for the thermal dehydration and heat treatment. The moisture level of the thermally dehydrated and non-thermally dehydrated samples at the final heating temperature was about 0%.

The samples were tested for inhibition using the following Brabender Procedure.

Brabender Procedure

The thermally inhibited, pregelatinized non-granular starch to be tested was slurried in a sufficient amount of distilled water to give a 4.6% anhydrous solids starch slurry at pH 3 as follows: 132.75 g of sucrose, 26.55 g of starch, 50 g of sodium citrate/citric acid buffer (pH 3), and 366.7 g of water were mixed for three minutes in a standard home Mixmaster blender at setting #1. The slurry was then introduced to the sample cup of a Brabender VISCO\Amylo\GRAPH (manufactured by C. W. Brabender Instruments, Inc., Hackensak, N.J.) fitted with a 350 cm/gram cartridge and the viscosity was measured as the slurry was heated to 30° C. and held for ten minutes. The viscosity at 30° C. and ten minutes (10') after holding at 30° C. were recorded. Heating was continued up to 95° C. and maintained at that temperature for 10 minutes (10').

The peak viscosity and viscosity ten minutes (10') after 95° C. were recorded in Brabender Units (BU) and used to calculate the percentage breakdown in viscosity according to the formula:

$$\%\text{ Breakdown} = \frac{\text{peak} - (95^\circ\text{ C.}+10\text{ min})}{\text{peak}} \times 100,$$

where "peak" is the peak viscosity in Brabender Units, and "(950°+10 min)" is the viscosity in Brabender Units at ten minutes after 95° C. If no peak viscosity was reached, i.e., the viscosity data indicated a rising curve or a flat curve, the viscosity at 95° C. and the viscosity at 10 minutes after attaining 95° C. were recorded.

The VISCO\Amylo\GRAPH records the torque required to balance the viscosity that develops when a starch slurry is subjected to a programmed heating cycle. The accuracy is ±2%.

Characterization of Inhibition by Brabender Curves

The resulting Brabender traces will be as follows: for a highly inhibited starch the trace will be flat, indicating that the starch is so inhibited that it is resisting any further gelatinization or the trace will be a rising curve, indicating that further gelatinization is occurring at a slow rate and to a limited extent; for a less inhibited starch, the trace will show a dropping curve, but the overall breakdown in viscosity from the peak viscosity will be lower than that for a non-inhibited control.

Characterization of Inhibition by Cooks

A dry blend of 7 g of starch or flour (anhydrous basis) and 14 g of sugar were added to 91 ml of water in a Waring blender cup at low speed, then transferred to a cook-up beaker, allowed to stand for 10 minutes, and then evaluated for viscosity, color, clarity and texture.

EXAMPLE 1

Samples of waxy maize, tapioca and potato starches, at pH 6, 8, and 10, were pregelatinized by drum-drying. The samples were placed in a 140° C. oven and dehydrated to anhydrous and heat treated at 140° C. for the indicated times.

The viscosity and textural characteristics of the thermally-inhibited (T-I) starches are set out below.

| pH | Heat Treatment Conditions | Viscosity of Cook | Texture of Cook |
|---|---|---|---|
| T-I Waxy Maize | | | |
| 6 | 2 hrs at 140° C. | heavy | very cohesive, pulpy |
| 6 | 4 hrs at 140° C. | heavy to very heavy | cohesive, pulpy |
| 6 | 6 hrs at 140° C. | heavy | slightly cohesive, pulpy |
| | 8 hrs at 140° C. | moderate to heavy | very slightly cohesive, pulpy |
| 8 | 2 hrs at 140° C. | heavy | very cohesive, pulpy |
| 8 | 4 hrs at 140° C. | heavy | slightly cohesive, pulpy |
| 8 | 6 hrs at 140° C. | moderate to heavy | very slightly cohesive, pulpy |
| 8 | 8 hrs at 140° C. | moderate to.heavy | very slightly cohesive, pulpy |
| 10 | 2 hrs at 140° C. | heavy | cohesive, pulpy |
| 10 | 4 hrs at 140° C. | heavy to moderate | very slightly cohesive, pulpy |
| 10 | 6 hrs at 140° C. | moderate | non-cohesive, short, pulpy |
| 10 | 8 hrs at 140° C. | moderate | non-cohesive, short, pulpy |
| T-I Tapioca | | | |
| 6 | 2 hrs at 140° C. | very heavy | cohesive, pulpy |
| 6 | 4 hrs at 140° C. | heavy to very heavy | slightly cohesive, pulpy |
| 6 | 6 hrs at 140° C. | moderately heavy | slightly cohesive, pulpy |
| 6 | 8 hrs at 140° C. | heavy | slightly cohesive, pulpy |
| 8 | 2 hrs at 140° C. | heavy to very heavy | very cohesive, pulpy |
| 8 | 4 hrs at 140° C. | heavy | very cohesive, pulpy |
| 8 | 6 hrs at 140° C. | N.D. | N.D. |
| 8 | 8 hrs at 140° C. | heavy | very slightly cohesive, pulpy |
| 10 | 2 hrs at 140° C. | heavy | cohesive, pulpy |
| 10 | 4 hrs at 140° C. | heavy to very heavy | slightly cohesive, pulpy |
| 10 | 6 hrs at 140° C. | heavy | non-cohesive, short, pulpy |
| 10 | 8 hrs at 140° C. | moderately heavy | non-cohesive, short, pulpy |
| T-I Potato | | | |
| 6 | 2 hrs at 140° C. | heavy to very heavy | cohesive, pulpy |
| 6 | 4 hrs at 140° C. | heavy | cohesive, pulpy |
| 6 | 6 hrs at 140° C. | moderate to heavy | cohesive, pulpy |
| 6 | 8 hrs at 140° C. | moderate to heavy | cohesive, pulpy |
| 8 | 2 hrs at 140° C. | heavy to very heavy | very cohesive, pulpy |
| 8 | 4 hrs at 140° C. | very heavy | cohesive, pulpy |
| 8 | 6 hrs at 140° C. | very heavy | cohesive, pulpy |
| 8 | 8 hrs at 140° C. | very heavy | cohesive, pulpy |
| 10 | 2 hrs at 140° C. | heavy to very heavy | very cohesive, pulpy |
| 10 | 4 hrs at 140° C. | very heavy | slight set, slightly chunky |
| 10 | 6 hrs at 140° C. | heavy | slight set, slightly chunky |
| 10 | 8 hrs at 140° C. | moderately heavy | moderate set, slightly chunky |

N.D. - not determined

Brabenders were run on some of the above starches. The results are shown below.

| pH | Heat Treatment Conditions | Viscosity (BU) 30° C. | 30° C. + 10' | Peak | 95° C. | 95° C. + 10' | Breakdown |
|---|---|---|---|---|---|---|---|
| T-I Waxy Maize | | | | | | | |
| 8 | 2 hrs at 140° C. | 665 | 3,000 | 4,620 | 1,120 | 300 | 94% |
| 8 | 6 hrs at 140° C. | 700 | 1,640 | 2,445 | 2,440 | 1,900 | 22% |
| T-I Tapioca | | | | | | | |
| 8 | 2 hrs at 140° C. | 1,500 | 3,170 | 3,290 | 680 | 600 | 82% |
| 8 | 6 hrs at 140° C. | 1,180 | 1,870 | 1,873 | 780 | 600 | 68% |

The results show that longer heating times and/or higher pHs are required to prepare non-cohesive starches at 140° C. It is expected that heating at 160° C., preferably in a fluidized bed, will provide non-cohesive starches.

Preferably, various lipids, proteins, and other off flavor components are extracted from the starch after the heat treatment using the procedure described in Example 7 or by refluxing the starch with ethanol in a Soxhlet extractor. This will improve the flavor.

EXAMPLE 2

A granular high amylose starch (50% amylose) was jet-cooked and spray-dried using the continuous coupled jet-cooking/spray-drying process described in U.S. Pat. No. 5,131,953 and then thermally inhibited. The jet-cooking/spray-drying conditions used were as follows:

| | |
|---|---|
| slurry | pH 8.5—9.0 |
| cook solids | 10% |
| moyno setting | about 1.5 |
| cooking temperature | about 145° C. |
| excess steam | 20% |
| boiler pressure | about 85 psi |
| back pressure | 65 psi |
| spray-dryer | Niro dryer |
| inlet temperature | 245° C. |
| outlet " | 115° C. |
| atomizer | centrifugal wheel |

The conditions used in the thermal inhibition process (oven dehydration and heat treatment) and the characteristics of the resulting thermally inhibited T-I starches are set out below.

High Amylose - PH 8.7

| Heat Treatment Conditions | Viscosity (BU) 30° C. | 30° C. + 10' | Peak | 95° C. | 95° C. + 10' | Breakdown |
|---|---|---|---|---|---|---|
| Control | 200 | 195 | 245 | 245 | 130 | 47% |
| 8 hrs at 140° C. | 350 | 240 | 420 | 410 | 335 | 20% |

EXAMPLE 3

A waxy maize starch which had been lightly crosslinked with 0.04% phosphorous oxychloride was thermally-inhibited. The granular starch was jet-cooked and spray-dried using the coupled continuous jet-cooking/spray-drying process and conditions described in Example 2. The conditions used in the thermal inhibition process (oven dehydrating and heat treating).

The Brabender results and viscosity and textural characteristics of the resulting thermally-inhibited starch are set out below.

Brabender Evaluation of Crosslinked Waxy Maize - pH 8.7

| Heat Treatment Conditions | Viscosity (BU) 30° C. | 30° C. + 10' | Peak | 95° C. | 95° C. + 10' | Breakdown |
|---|---|---|---|---|---|---|
| Control | 150 | 165 | 215 | 120 | 70 | 67% |
| 8 hrs at 140° C. | 840 | 1,085 | 1,110 | 1,090 | 1,085 | 1% |

Cook Evaluation of Crosslinked Waxy Maize - pH 8.7

| Heat Treatment Conditions | Viscosity of Cook | Texture of Cook |
|---|---|---|
| Control | thin to moderate | cohesive, pulpy |
| 8 hrs at 140° C. | very heavy | non-cohesive, very pulpy, short |

The results show that after the dehydration and heat treatment steps the crosslinked starch was very highly inhibited.

EXAMPLE 4

Thermally-inhibited waxy maize starches were prepared by drum-drying the starches prior to thermal inhibition. The resulting thermally-inhibited starches are compared with thermally-inhibited waxy maize starches prepared by the continuous coupled jet-cooking and spray-drying process used in Example 2 and the dual atomizatio/spray drying process described in U.S. Pat. No. 4,280,251.

The conditions used for the oven dehydration and heat treatment and the characterization of the resulting thermally-inhibited (T-I) starches are shown below.

| Heat Treatment | Drum-Dried/Thermally-Inhibited Waxy Maize - pH 8 | | | | | |
|---|---|---|---|---|---|---|
| | Viscosity (BU) | | | | | |
| Conditions | 30° C. | 30° C. + 10' | Peak | 95° C. | 95° C. + 10' | Breakdown |
| Control | 640 | 2770 | 3,530 | 1,690 | 1,550 | 56% |
| 8 hrs. at 140° C. | 700 | 1640 | 2,440 | 2,365 | 1,860 | 24% |

| | Conditions | | Viscosity (BU) | | | | | |
|---|---|---|---|---|---|---|---|---|
| | DD/TI | TI/DD | 30° C. | 30° C. + 10' | Peak | 95° C. | 95° C. + 10' | Breakdown |
| Waxy Maize - pH 8 | | | | | | | | |
| Control | — | — | 640 | 2,770 | 3,530 | 380 | 122 | 97% |
| T-I Starch | 8 hrs at 140° C. | — | 642 | 1,080 | 1,700 | 1,670 | 1,510 | 11% |
| T-I Starch | — | 8 hrs at 140° C. | 650 | 2,040 | 2,850 | 840 | 480 | 83% |
| Tapioca - pH 8 | | | | | | | | |
| Control | — | — | 500 | 2,600 | 2,800 | 185 | 45 | 98% |
| T-I Starch | 8 hrs at 140° C. | — | 720 | 1,165 | 1,170 | 730 | 570 | 51% |
| T-I Starch | — | 8 hrs at 140° C. | 590 | 1,345 | 1,365 | 530 | 370 | 73% |
| Potato - pH 8 | | | | | | | | |
| Control | — | — | 170 | 1,355 | 1,395 | 185 | 75 | 95% |
| T-I Starch | 8 hrs at 140° C. | — | 380 | 935 | 1,035 | 965 | 740 | 29% |
| T-I Starch | — | 8 hrs at 140° C. | 390 | 990 | 1,010 | 610 | 450 | 55% |

DD/TI indicates that the drum drying was carried out before the thermal inhibition (dehydrating and heat treating at 140° C. for 8 hrs).
TI/DD indicates that the thermal inhibition (dehydrating and heat treating at 140° C. for 8 hrs) was carried out before the drum drying.

The results show that thermally-inhibited, starches can be prepared when the drum drying is carried out after the thermal inhibition.

EXAMPLE 6

This example compares a pregelatinized non-granular starch which was dehydrated by ethanol extraction with a pregelatinized non-granular starch which was dehydrated in an oven. Both starches were heat treated using the same conditions.

A waxy maize starch was adjusted to pH 9.5 and then drum dried using the procedures described previously.

| Heat Treatment Conditions | Viscosity (BU) | | | | | Breakdown |
|---|---|---|---|---|---|---|
| tions | 30° C. | 30° C. + 10' | Peak | 95° C. | 95° C. + 10' | down |
| Jet-Cooked/Spray-Dried/Thermally-Inhibited Waxy Maize - pH 8 | | | | | | |
| Control | 60 | 90 | 100 | 41 | 30 | 70% |
| 8 hrs at 140° C. | 485 | 1540 | 1,545 | 1,330 | 1,230 | 20% |
| Steam Atomized/Spray-Dried/Thermally-Inhibited Waxy Maize - pH 8 (comparative example) | | | | | | |
| Control | 100 | 1010 | 1,080 | 340 | 170 | 84% |
| 8 hrs at 140° C. | 360 | 950 | 970 | 860 | 650 | 33% |

The results show that after 8 hours heat treatment at 140° C. all the starches showed much less breakdown. The results also show that a higher degree of inhibition along with a higher peak viscosity can be obtained if the starch granules are completely disrupted as by drum drying or jet cooking.

EXAMPLE 5

This example shows that, unlike the process of U.S. Pat. No. 4,391,836 (issued Jul. 5, 1983 to C. W. Chiu), the sequence in which the drum drying and heat treating is carried out does not interfere with the thermal inhibition process. The '836 patent teaches that instant gelling tapioca and potato starches can only be prepared when the drum drying is carried out first (see comparative Example VII of the '836 patent).

Waxy maize, tapioca, and potato starches were adjusted to pH 8 and drum dried (DD) before and after being thermally inhibited (T-I) by dehydrating and heat treating at 140° C. for 8 hours.

The Brabender results are shown below. The sample was then placed into a Soxhlet extractor and refluxed for about 16 hours with ethanol. The starch was then removed from the Soxhlet thimble laid out to flash off any excess ethanol (about 20–30 minutes) and placed into a forced draft oven and heated for 6 hours at 140° C.

| Description | Viscosity in Brabender Units | | | | | Breakdown |
|---|---|---|---|---|---|---|
| | 30° C. | 30° C. + 10' | Peak | 95° C. | 95° C. + 10' | |
| Control* | 100 | 1010 | 1080 | 340 | 170 | 84% |
| Ethanol extracted and heat treated 6 hours at 140° C. | 300 | 655 | 1080 | 1000 | 1080 | 0% |
| Oven dehydrated and heat treated 6 hours at 140° C. | 420 | 585 | 800 | 705 | 800 | 0% |

*Drum-dried but not dehydrated and heat treated.

The results show that both starches were highly inhibited. The ethanol extracted starch was higher in viscosity.

EXAMPLE 7

This example shows that dehydration by alcohol extraction provides better tasting thermally-inhibited starches.

The test performed was a "Triangle Taste Test" which employs three coded samples, two identical and one different, presented simultaneously. None of the samples is identified as the standard. Control and experimental treatments were systematically varied so that each was presented in odd and identical sample positions an equal number of times. The judges determined which of the three samples differed from the other two. A forced choice was requited. Statistical analysis was used to determine whether a significant difference between treatments existed. The probability of choosing the different or odd sample by chance alone was one-third. Once the odd sample was chosen the judges were asked why the samples were different and which they preferred.

The starches tested were maize starches adjusted to pH 9.5 and heat treated for 7 hours at 140° C. but one sample was dehydrated by ethanol extraction and the other sample was thermally dehydrated prior to the heat treatment.

The thermally-inhibited starches were washed by slurring the granular starch with 1.5 parts water, mixing for 10 minutes on a stir plate, vacuum filtering the slurry, and washing the starch cake twice with 50 mls of distilled water. Then sufficient water was added to bring the slurry solids to 3%. The pH was adjusted to 6.0–6.5. The slurry was cooked 20 minutes in a boiling water bath, cooled to slightly above room temperature, and evaluated.

The judges were given 20 ml samples for tasting.

They observed a significant difference between the oven-dehydrated and ethanol-dehydrated starches. Nine out of the twelve judges chose the one different sample. All nine of the judges who could determine the different sample preferred the sample that was ethanol-extracted. Attributes that were used to describe the ethanol-extracted starch sample included clean, not bitter, and smooth compared to the oven-dehydrated starch sample.

EXAMPLE 8

This example shows that an alcohol extraction of a thermally-inhibited pregelatinized non-granular starch provides a better tasting starch.

A thermally-inhibited, pregelatinized non-granular waxy maize (adjusted to pH 9.5, drum dried, and heat treated for 180 minutes in a fluidized bed at 160° C.) was placed in a Soxhlet extractor and allowed to reflux overnight (about 17 hrs) using ethanol as the solvent (bp-78° C.). The extracted starch was then laid on paper to allow excess ethanol to flash off. The starch was slurred at 3% solids by adding the dry starch to the water in a Waring blender cup at a low speed. The samples were allowed to stand for 10 minutes and then evaluated for taste. The thermally-inhibited, non-ethanol-extracted base was used as the comparison sample in the taste evaluation.

The taste test was a "Paired-Preference Test". Two samples are presented, simultaneously or sequentially. The judge is requested to express a preference based on a specific attribute, here a cleaner taste. Results are obtained in terms of relative frequencies of choice of the two samples as accumulated for all participants. The four trained judges identified the ethanol-extracted sample as having a blander, cleaner flavor with less aftertaste.

EXAMPLE 9

This example describes the effect of removing various proteins, lipids, and other off flavor components on the flavor (i.e., taste and smell) of a thermally-inhibited waxy maize.

Prior to either the pregelatinization process or the thermal inhibition process (i.e., dehydrating and heat treating), the protein is extracted from a waxy maize starch as follows. The starch is slurried at W=1.5 (50 lbs starch to 75 lbs of water) and the pH is adjusted to 3–3.5 with sulfuric acid. Sodium chlorite is added to give 2% on the weight of the starch. The starch is steeped overnight at room temperature. The pH is raised to about 9.5 using a 3% sodium hydroxide solution and washed well prior to drying. The protein level of the starch should be reduced to about 0.1%. The protein level of the untreated waxy maize is about 0.3%.

This treatment should improve the flavor of the thermally-inhibited pregelatinized non-granular starches since the same treatment of a thermally-inhibited granular waxy maize improved the flavor as reported below. Removal of various proteins, lipids, and other off flavor components is expected to improve the flavor of all starch bases and flours.

Using a one-sided, directional difference taste testing procedure, as described in "Sensory Evaluation Techniques" by M. Meilgaard et al., pp. 47–111 (CRC Press Inc., Boca Raton, Fla. 1987), a protein-reduced thermally-inhibited waxy maize (pH adjusted 9.5 and dehydrated and heat treated for 90 min at 160° C.) was compared to a thermally-inhibited waxy maize (pH adjusted 9.5 and dehydrated and heat treated for 90 min at 160° C.) which had not been protein-reduced prior to the thermal inhibition process.

For the taste test, 3% starch cooks (samples heated at 100° C. for 15 min) were prepared and panelists were asked to select which sample was "cleaner" in flavor. All tests were done in a sensory evaluation room under red lights in order to negate any color differences that may have been present between samples. The results are shown below:

| Trial # | Number of Panelists | Number of Positive Responses[1] | Significance Level (α risk)[2] |
|---|---|---|---|
| 1 | 15 | 12 | 5% |
| 2 | 14 | 11 | 5% |

[1]The number indicates those respondents who selected the protein-reduced product as being cleaner in flavor.
[2]The α values were determined from a statistical table. An α risk of 5% indicates (with 95% confidence) that the samples are statistically different, i.e., that the protein-reduced starch is cleaner than the control starch.

The above results show that protein removal prior to the heat treatment helped to improve the flavor of the thermally-inhibited non-pregelatinized granular waxy maize starch.

Now that the preferred embodiments of the invention have been described in detail, various modifications and improvements thereon will become readily apparent to the practitioner. Accordingly, the spirit and scope of the present invention are to be limited only by the appended claims, and not by foregoing specification.

What is claimed is:

1. A thermally-inhibited, pregelatinized non-granular starch or flour which is prepared by the steps of:

pregelatinizing the starch or flour using a process which disrupts the granular structure of the starch or flour; and inhibiting the starch or flour by dehydrating, thermally or non-thermally, the starch or flour to substantially anhydrous or anhydrous and then heat treating the dehydrated starch or flour at about 100° C. or greater for a period of time sufficient to inhibit the starch or flour.

2. The starch or flour of claim 1, wherein the starch or the flour is adjusted to a pH of about 7 or greater prior to the pregelatinizing step or the inhibiting step.

3. The starch or flour of claim 2, wherein the inhibiting step is carried out prior to the pregelatinizing step and wherein the pregelatinizing step is carried out by drum drying, extruding, or jet-cooking and spray-drying.

4. The starch or flour of claim 2, herein the pregelatinizing step is carried out prior to the inhibiting step and wherein the pregelatinizing step is carried out by drum drying, extruding, or jet-cooking and spray-drying.

5. The starch or flour of claim 2, wherein the starch or flour is dehydrated thermally by heating at about 100° C. or above, and wherein the dehydrated starch or flour is heated at about 120° to about 160° C. for up to about 20 hours.

6. The starch or flour of claim 2, wherein the starch or flour is dehydrated non-thermally by extracting the water using a solvent or by freeze-drying and wherein the dehydrated starch or flour is heated at about 120° to about 160° C. for up to about 20 hours.

7. The starch or flour of claim 6, wherein the solvent is a hydrophilic solvent.

8. The starch or flour of claim 7, wherein the hydrophilic solvent is ethanol.

9. The starch or flour of claim 2, wherein the starch or flour is a waxy starch or flour.

10. The starch or flour of claim 9, wherein the waxy starch is waxy maize, waxy rice, waxy barley, waxy potato, or waxy sorghum.

11. A food containing the starch or flour of claim 9.

12. The starch or flour of claim 2, wherein the starch or flour is potato, tapioca, banana, corn, pea, potato, sweet potato, barley, wheat, rice, sago, amaranth, sorghum, v.o. hybrid, or high amylose corn starch or flour.

13. The starch of claim 12, wherein the starch is tapioca starch or potato starch.

14. A food containing the starch or flour of claim 12.

15. The starch of claim 2, wherein the starch is a modified starch selected from the group consisting of a derivatized starch, a converted starch, a chemically crosslinked starch, a derivatized and converted starch, a derivatized and chemically crosslinked starch, and a converted and chemically crosslinked starch.

16. The flour of claim 2, wherein the flour is a modified flour selected from the group consisting of bleached flour and enzyme-converted flour.

17. A food containing the starch or flour of claim 2.

18. The starch or flour of claim 1, wherein the inhibiting step is carried out prior to the pregelatinizing step and wherein the pregelatinizing step is carried out by drum drying, extruding, or jet-cooking and spray-drying.

19. The starch or flour of claim 1, wherein the pregelatinizing step is carried out prior to the inhibiting step and wherein the pregelatinizing step is carried out by drum drying, extruding, or jet-cooking and spray-drying.

20. The starch or flour of claim 1, wherein the starch or flour is dehydrated thermally by heating at about 100° C. or above, and wherein the dehydrated starch or flour is heated at about 120°. to about 160° C. for up to about 20 hours.

21. The starch or flour of claim 1, wherein the starch or flour is dehydrated non-thermally by extracting the water using a solvent or by freeze-drying and wherein the dehydrated starch or flour is heated at about 120° to about 160° C. for up to about 20 hours.

22. The starch or flour of claim 21, wherein the solvent is a hydrophilic solvent.

23. The starch or flour of claim 22 wherein the hydrophilic solvent is ethanol.

24. The starch or flour of claim 1, wherein the starch or flour is a waxy starch or flour.

25. The starch or flour of claim 24, wherein the waxy starch is waxy maize, waxy rice, waxy barley, waxy potato, or waxy sorghum.

26. A food containing the starch or flour of claim 24.

27. The starch or flour of claim 1, wherein the starch or flour is potato, tapioca, banana, corn, pea, potato, sweet potato, barley, wheat, rice, sago, amaranth, sorghum, v.o. hybrid, or high amylose corn starch or flour.

28. The starch of claims 27, wherein the starch is tapioca starch or potato starch.

29. A food containing the starch or flour of claim 27.

30. The starch of claim 1, wherein the starch is a modified starch selected from the group consisting of a derivatized starch, a converted starch, a chemically crosslinked starch, a derivatized and converted starch, a derivatized and chemically crosslinked starch, and a converted and chemically crosslinked starch.

31. The starch or flour of claim 1, wherein the starch or flour is non-cohesive when dispersed in cold water.

32. The starch or flour of claim 1, wherein the starch or flour is pregelatinized by drum drying, extruding, or jet-cooking and spray-dying.

33. The starch or flour of claim 1, wherein the starch is a modified starch.

34. The starch of claim 33, wherein the modified starch is selected from the group consisting of a derivatized starch, a converted starch, a chemically crosslinked starch, a derivatized and converted starch, a derivatized and chemically crosslinked starch, and a converted and chemically crosslinked starch.

35. The starch or flour of claim 1, wherein the flour is a modified flour.

36. The flour of claim 35, wherein the modified flour is bleached or enzyme-converted.

37. The flour of claim 1, wherein the flour is a modified flour selected from the group consisting of bleached flour and enzyme-converted flour.

38. A food containing the starch or flour of claim 1.

39. thermally-inhibited, pregelatinized non-granular waxy starch or flour which is substantially free of off flavor from proteins, lipids, and/or other off flavor components.

40. The starch of claim 39, wherein the starch or flour is non-cohesive when dispersed in cold water and is selected from the group consisting of waxy maize, waxy rice, waxy barley, waxy potato, and waxy sorghum.

41. The starch or flour of claim 39, wherein the starch or flour is pregelatinized by drum drying, extruding, or jet-cooking and spray-drying.

42. The starch of claim 39, wherein the starch is a modified starch.

43. The starch of claim 42, wherein the starch is a modified starch selected from the group consisting of a derivatized starch, a converted starch, a chemically crosslinked starch, a derivatized and converted starch, a derivatized and chemically crosslinked starch, and a converted and chemically crosslinked starch.

* * * * *